Oct. 9, 1973     L. F. BEAN     3,764,311
FROST IMAGING SYSTEM
Original Filed Sept. 1, 1966     2 Sheets-Sheet 1
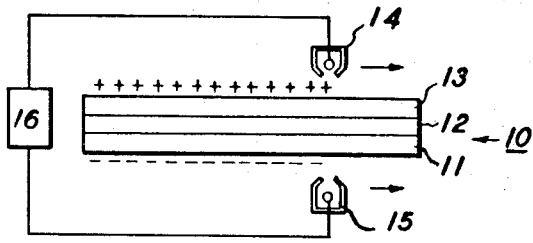
FIG. 1A
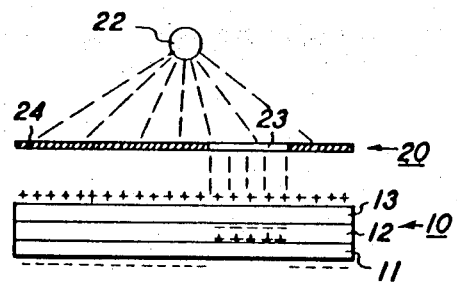
FIG. 1B
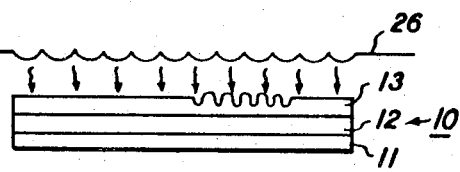
FIG. 1C
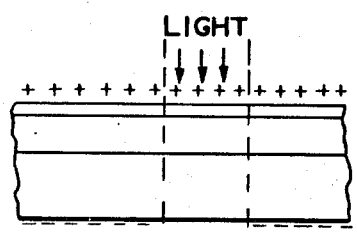
FIG. 2A
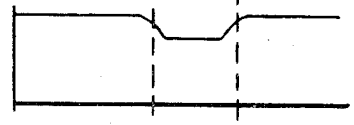
FIG. 2B
FIG. 2C
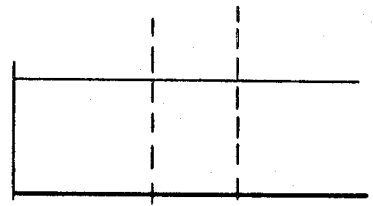
FIG. 2D
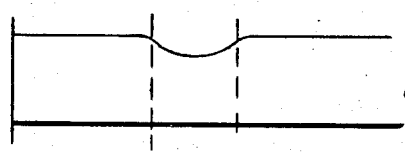
FIG. 2E
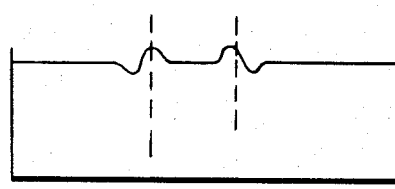
INVENTOR.
LLOYD F. BEAN
BY
David C. Petre
ATTORNEY

# United States Patent Office 3,764,311
Patented Oct. 9, 1973

3,764,311
FROST IMAGING SYSTEM
Lloyd F. Bean, Rochester, N.Y., assignor to Xerox Corporation, Stamford, Conn.
Continuation of abandoned application Ser. No. 576,648, Sept. 1, 1966. This application July 28, 1970, Ser. No. 58,806
Int. Cl. B41m 5/18, 5/20; G03g 13/12
U.S. Cl. 96—1.1
69 Claims

ABSTRACT OF THE DISCLOSURE

An imaging member comprising a support layer, a photoconductive layer overlying said support layer and a charge retaining surface deformable layer overlying said photoconductive layer is electrically charged, imagewise exposed and maintained in a softenable state whereby the surface layer deforms in a frost pattern. Single charge and optical screening methods and imaging members with optical screens are also disclosed.

CROSS REFERENCE TO RELATED APPLICATION

This is a continuation of applicant's copending application Ser. No. 576,648 filed Sept. 1, 1966 now abandoned.

BACKGROUND OF THE INVENTION

This invention relates to an imaging system and more particularly to a novel system for forming visible patterns on a deformable layer.

Prior art systems are known in which an image is reproduced as surface deformations on a deformable layer by the combined influence of an electrostatic field and softening upon the deformable layer. But such systems have required high vacuum systems to form the image, complex optical systems to view the image and have lacked the ability to reproduce continuous tone images. These imaging systems which have been called "relief" imaging systems produce a ridge-like deformation in the deformable layer at areas of high potential gradient in the applied charge pattern. Since the relief technique produces a deformation, for the most part, only at the edges of the charged area, it is most suitable for the reproduction of high contrast subjects such as line copy or the like. The rudiments of relief imaging involve applying a latent electrostatic image or a charge pattern to an insulating deformable film which is softenable as by the application of either heat or solvent vapor and softening the film until the electric field force of the charge pattern deforms the film. See for examples of relief imaging systems Glenn, Jr., Pat. 3,113,179; Norton Pat. 2,985,866; Dreyfoos, Jr., et al. Pat. 3,055,006; Boldebuck Pat. 3,063,872 and Cusano et al. Pat. No. 3,095,324.

There has recently been developed other imaging systems employing some of the same techniques employed in "relief" imaging, which by influence of electrostatic fields and softening of the deformable layer produce a series of very small surface folds or wrinkles giving the image produced a frosted appearance. These systems have been called "frost" imaging systems and are noted for their ability to produce quality continuous tone as well as line copy images, which images may be viewed directly or by much simpler optical systems than relief type images. For examples of "frosting" systems see Gunther et al. Pat. 3,196,011, Mihajlov et al. Pat. 3,196,008, and R. W. Gundlach and C. J. Claus, A Cyclic Xerographic Method Based on Frost Deformation, Phot. Sci. & Eng. 7,1 pp. 14–19 (1963).

It is characteristic of a typical embodiment of a prior art frost system that a, charge—at least one exposure—at least one recharge—soften, processing sequence is required to produce frosting. This is thought to be required since it is postulated that charge density differences are required to create frosting. It is thought that in light struck areas of a typical, charged prior art frost member, for example, comprising a deformable layer overlying a photoconductive insulating layer overlying an electrically conductive support, the collapsing of the field in light struck photoconductor portions would not change the charge density on the corresponding portions of the free surface of the deformable layer but would lower the potential at the surface of the deformable layer and allow such portions of lower potential to accept more charge upon recharging to create charge density differences and upon softening, frosting. The recharge step although thought to be necessary adds complexity and cost to the frost process.

Prior art frost systems also typically employ a member including a deformable layer on a layer of photoconductive insulating material supported by an electrically conductive layer. The supporting electrically conductive layer may comprise a single support material which is electrically conductive itself or may be a composite of an electrically conductive layer on, for example, an insulating film type material.

The electrically conductive support in prior art frost members allows the member to be sensitized by conventional corona charging with the conductive layer being grounded. Where an electrically conductive layer is supported by an electrically insulating layer, for example, glass or polyester film, the conductive member makes possible a high unit area capacitance of the free surface of the insulator to a controllable electrode. This allows a larger charge to be deposited on the member which has been found to enhance resultant image density and contrast.

This increase in the unit area capacitance of the insulating film is important to the workability of prior art frost members as shown by the following relationship of unit area capacitance of the insulating film to the charge contrast.

$$\Delta\sigma = C_i^2 V_0 \left(\frac{1}{C_i + C_p}\right) \text{ for simultaneous charge and exposure} \quad (1)$$

$$\Delta\sigma = C_p V_0 \left(\frac{C}{C_i + C_p}\right) \text{ for sequential charge and exposure} \quad (2)$$

where $\Delta\sigma$=maximum theoretical charge contrast
$V_0$=potential applied across structure by corona charging
$C_i$=unit area capacitance of the insulating layer
$C_p$=unit area capacitance of the photoconductive, charge control layer Since the applied potential, $V_0$, is limited by the dielectric strength of the materials in the frost member and the unit area capacitance of the photoconductor is chosen on the basis of photoconductive response, the unit area capacitance of the free surface of the insulator to ground is the one variable which can change to control the image contrast. When the support member was electrically insulating, for example, a 12½ micron sheet of Mylar, a polyester film available from E. I. du Pont de Nemours & Co., with no conductive layer at all, the final charge contrast, $\Delta\phi$, would be so small that the developed frost image would be of very low contrast. This reduction of charge contrast, due to the insert support layer, made necessary the elimination of the insulating layer as a part of the electrically active region for satisfactory results.

An insulating film such as a Mylar film with a thin overcoating layer of electrically conductive material, for example, most metals was one embodiment of a supported electrically conductive layer which was found to greatly increase $\Delta\phi$ with resultant increased contrast frost images. This type of support has found extensive acceptance in the art. Of course, the presence of a metalized film as a necessary part of a frost member increases the cost and complexity of the member especially in the art of frosting where the surfaces of the photoconductor and the metal at their interface should be very smooth to ensure complete and uniform contact which is necessary for blemish free images. Additionally, it has been found that these metalized films may become oxidized thus increasing their electrical resistance to the point where the highly suitable method of corona charging is retarded. It has also been found that in the manufacture of the metalized films and especially in the manufacture of films where the metallic layer is sufficiently thin to be transparent to allow exposure of the film from the support side of the tape and to permit use of the resultant frost image as a transparency for image viewing purposes, that scratching of the metal film in the coating operation created areas which could not be corona charged thus producing defects in the resultant frost image. Also, cracking of the metal film was found to occur when the imaging member was bent or twisted.

Additionally, of course, no matter how thin the metallic layer there will be some decrease of light transmission efficiency because of reflection and absorption of light by the metalized film thus retarding support side exposure and transparency projection of the resultant frost image.

It is, therefore, an object of this invention to provide a system for electrostatically forming visible frost patterns on the surface of a deformable layer of material which overcomes the above-noted disadvantages.

It is a further object of this invention to provide a frost imaging system wherein a recharge processing step is not required to produce frosting.

It is a further object of this invention to provide a simpler, cheaper, more easily manufactured and easily stored frostable member.

It is a further object of this invention to provide a frost member embodiment a conductorless electrostatically conductive backed imaging member.

It is a further object of this invention to provide an imaging system capable of continuous tone and large solid area reproduction as well as line copy reproduction.

It is a still further object of this invention to provide an imaging system capable of being developed in room light.

It is a still further object of this invention to provide an imaging system capable of producing frost images of excellent resolution.

It is a still further object of this invention to provide an imaging system wherein optical screening may be utilized to enhance image characteristics.

The foregoing objects and others are accomplished in accordance with this invention by providing in a first frost member embodiment a conductorless electrostatically deformable member, generally comprising a deformable layer on a photoconductive layer on an electrically insulating layer; or in a second first member embodiment comprising a prior art type conductive backing frost member, both embodiments capable of producing frost images without a recharge step and when processed with optical screening techniques to be described herein are capable of producing high quality continuous tone and solid area images of high density, contrast and resolution without a recharge processing step. In addition, various advantageous recharge techniques for processing conductorless frost members may be employed as described herein.

For a better understanding of the invention as well as other objects and further features thereof, reference is made to the following detailed disclosure of this invention taken in conjunction with the accompanying drawings wherein:

FIG. 1 is a partially schematic representation of the steps in carrying out a single charge processing embodiment of the invention capable of producing frosting on either conductorless or conductor type frost member embodiments but illustrating a representative conductorless frost member;

FIG. 2 is a graphical representation of the voltage and charge density thought to be present at the surface of the deformable layer immediately after exposing a conductorless or a conductor type frost member, and about 4 seconds after exposure;

Figure 3:
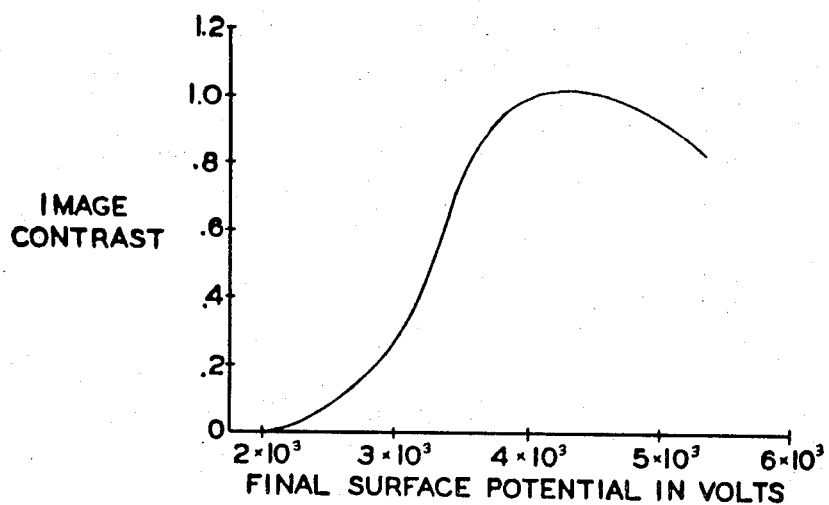
FIG. 3 is a graph of final surface potential across a particular conductorless frost member versus image contrast for another process embodiment hereof employing a recharge step for developing conductorless frost members.

Referring now to FIG. 1(a) there is shown conductorless frost member 10 comprising deformable layer 13 on photoconductive insulating material 12 on insulating support 11. The frost member is being uniformly charged according to one process embodiment of the invention by corona discharge devices 14 and 15 electrically connected to high voltage power source 16.

It is to be noted that the processing steps illustrated in FIG. 1 may also be used to process conductive backing type frost members constructed for example as described in the aforementioned Gunther et al. patent. The following detailed description of the imaging member itself applies to both conductorless and conductor type frost members except where the backing layer 11 is discussed. In conductor type systems layer 11 is electrically conductive as described in the Gunther et al. patent.

Layer 12 may comprise the various photoconductive insulating materials known to be useful in the art of xerography. The two organic photoconductive insulating materials comprising 2,5 - bis(p-aminophenyl)-1,3,4-oxadiazole available under the trademark TO 1920 from Kalle & Co., Weisbaden-Biebrich, Germany in a resinous binder material prepared for example as described in Example I and polyvinyl carbazole, available under the trademark Luvican M170 from Winter, Wolff & Co., New York, N.Y., sensitized with 2,4,7-trinitro-9-fluorenone prepared for example as described in Example II are found to be preferred photoconductive insulating materials for use herein primarily because of their photoconductive insulating characteristics and their transparency which permits the frosted member to be used as a transparency as well as viewed by reflected light. Other transparent photoconductors are available and may be suitable herein. Also, non-transparent photoconductors are usable herein since frost images are readily viewable by reflected light. Thus, any suitable photoconductive insulating layer may be used in carrying out the invention. Typical photoconductive insulating layers include: amorphous selenium, alloys of sulfur, arsenic or tellurium with selenium, selenium doped with materials such as thallium, cadmium sulfide, cadmium selenide, etc., particulate photoconductive materials such as zinc sulfide, zinc cadmium sulfide, French process zinc oxide, phthalocyanine, cadmium sulfide, cadmium selenide, zinc silicate, cadmium sulfoselenide, linear quinacridones, etc. dispersed in an insulating inorganic film forming binder such as a glass or an insulating organic film forming binder such as an epoxy resin, a silicone resin, an alkyd resin, a styrene-butadiene rein, a wax or the like. Other typical photoconductive insulating materials include: blends, copolymers, terpolymers, etc. of photoconductors and non-photoconductive materials which are either copolymerizable or miscible together to form solid solutions and organic photoconductive materials of this type include: anthracene, polyvinylanthracene, anthraquinone, oxadiazole, derivatives such as 2,5-bis-(p-amino-phenyl) - 1,3,4 - oxadiazole; 2-phenylbenzoxazole; and charge transfer complexes made by complexing resins such as polyvinyl carbazole, phenolaldehydes, epoxies, phenoxies, polycarbonates, etc. with Lewis acids such as phthalic anhydride; 2,4,7-trinitrofluoreone; metallic chlorides such as aluminum, zinc or ferric chloride; 4,4-bis(dimethylamino)benzophenone; chloranil, picric acid; 1,3,5 - trinitrobenzene; 1 - chloroanthraquinone; bromal; 4-nitrobenzaldehyde; 4-nitrophenol; acetic anhydride; maleic anhydride; boron trichloride; maleic acid, cinnamic acid; benzoic acid; tartaric acid; malonic acid and mixtures thereof.

It is found that the thickness of the photoconductive layer 12 is a factor in high resolution embodiments, but may vary over a wide range. With the preferred photoconductive layers specified herein a preferred layer thickness of between about 6 and 20 microns is found to produce very high density, high resolution images, with layer thicknesses varying from about 3 microns to about 40 microns being satisfactory. Decreasing the thicknesses of the photoconductor below about 3 microns is found to cause a reduction in the exposure latitude and resultant image density. Increasing the thickness of the photoconductive layer to greater than about 40 microns is found to increase the dark current and decrease the layer's light response to an appreciable degree.

Referring now to layer 13, the invention may be carried out with a wide variety of deformable materials. Layer 13 comprises a thin layer of material which is normally solid and electrically insulating, but which may be temporarily softened by application of heat, solvents, solvent vapors or the like. Layer 13 may be opaque or transparent but is preferably transparent to allow exposure of the frost member from the deformable layer side and to allow the resultant frosted member to be used as a transparency. Layer 13 should preferably be very smooth to enhance resultant image contrast between frosted and non-frosted areas of the deformable material.

Where deformable layer 13 is to be softened by heating, it may comprise, for example, any suitable electrically insulating thermoplastic resin capable of being softened at a moderate temperature and retaining an electrostatic charge at such a temperature. While the invention may conveniently be used with deformable materials which are solid at room temperature and which are temporarily softened by heating or the like, it can also be carried out with materials which are viscous, for example at about $10^5$ poises, at room temperatures but which can be solidified by cooling when required, and can also be carried out with materials that harden or polymerize by heating.

Piccolastic A-50 and Piccotex-100 resins available from Pennsylvania Industrial Chemical Corp., Staybelite Ester 10 available from Hercules Powder Co. and Velsicol X-37, bulk form, a hard, hydrocarbon copolymer resin available from Velsicol Chemical Corp., are preferred deformable materials for use herein because of their suitable deformable and insulating properties and because of their high transparency.

Many other materials have been found which are suitable for forming layer 13 and which are suitable for use with solvent vapor softening procedures as well as with heat softening. Any suitable deformable material may be used. Table I below is a typical partial list of such materials.

TABLE I

| Trademark | Chemical type | Manufacturer |
| --- | --- | --- |
| (1) Piccotex | Styrene | Pennsylvania Industrial Chemical Corp. |
| (2) Piccolyte | Terpene resin | Do. |
| (3) Staybelite 5 | Rosin ester | Hercules Powder Co. |
| (4) Staybelite 10 | do | Do. |
| (5) Piccoumaron | Coumarone | Pennsylvania Industrial Chemical Corp. |
| (6) Piccolastic D150 | Styrene | Do. |
| (7) Piccoflex 100A | Polyvinyl chloride | Do. |
| (8) Neville R13 | Coumarone indene | Neville Chemical Co. |
| (9) Nevillac soft | Phenol modified coumarone indene. | Do. |
| (10) Piccolastic E125 | Styrene | Pennsylvania Industrial Chemical Corp. |
| (11) Piccolastic D125 | do | Do. |
| (12) Picco 75 | Indene | Do. |
| (13) Piccopale 70 | Hydrocarbon (unsaturated). | Do. |
| (14) Piccolastic A-50 | Styrene | Do. |
| (15) Piccolastic A-75 | do | Do. |

Layer 13 may have a thickness lying within a broad range. In general, however, it has been found that surface frosting does not take place, or at least is not readily observable, when layer 13 is much less than about ½ micron in thickness. As layer 13 is increased in thickness, the frosted areas change in appearance from a very fine-grained frosting to a relatively coarse-grained bubbly appearance. Frosting, however, is observable with deformable layers in excess of 100 microns thickness. Resolution is higher with fine-grained frosting and layer 13 should preferably be in the range of from about 1 to 6 microns in thickness to achieve these higher resolutions. Deformable films in the order of from 2 to 2½ microns were especially preferred because of very high resolution, high density images resulting from use of this thickness film. For these thinner films, the deformable material should be reasonably stable against oxidation and other changes.

Insulating support layer 11 is preferably transparent to allow exposure of the frost member from the support side and to allow the resultant frost image to be used as a transparency. Also, if the frost member is to be developed by heating, the support material should be reasonably dimensionally stable over the range of temperature used in processing the member and should be able to hold its high electrical resistivity at such temperatures. Generally, layer 11 comprising a material of electrical resistivity greater than about $10^{14}$ ohm-centimeters is found to be preferred for use herein because of the ability of such a material to accept and retain the higher voltage charge applications.

Preferred support materials exhibiting all of the above properties are the polyester films sold under the trademarks Kodar available from the Eastman Kodak Co., and Mylar. Any suitable support material may be used. Typical support materials include polyethylene, vinyl film available from the Goodyear Tire & Rubber Co. and others.

Since the insulating support layer is a part of the electrically active region in the conductorless frost member embodiment of this invention, the selection of substrate thicknesses will depend not only on mechanical support characteristics and ease of handling during coating and processing of the member, but also on the electrical potential across the conductorless frost member required to produce quality frost images. Thus increasing the thickness of the support layer in the conductorless frost member embodiment of this invention will be seen to require a greater potential difference across the member to keep surface charge density and average potential gradient across the member a constant. Generally, a layer thickness of between about 25 and 200 microns is found to be preferred herein to give adequate mechanical support and electrical insulation to the member and to not tax conventional charging systems.

As shown in FIG. 1(a) two oppositely biased corona discharge devices 14 and 15 in direct opposed relation may be used to electrostatically charge frost member 10 interposed between the devices, by moving the member relative to the charging devices or, of course, by moving the corona charging devices relative to a fixed frost member. One pass or a number of passes may be made. Corona charging is a convenient charging means for use herein since corona discharge devices generally can apply either positively or negatively charged particles, and come in many shapes and sizes. For example, corona discharge devices of the general description and generally operated as disclosed in Vyverberg Pat. 2,836,725 and Walkup Pat. 2,777,957 have been found to be excellent sources of corona useful in the charging of frost members. Also, radioactive sources as described in Dessauer, Mott, Bogdonoff, Photo Eng. 6,250 (1955) as well as other sources of corona are available for charging and recharging embodiments of the invention.

Corona devices 14 and 15 are illustrated to be an adaption of the type disclosed in the aforementioned Vyverberg patent. Device 14 is shown to be emitting positively charged particles, charging the surface of layer 13 positively and device 15 is shown to be emitting negatively charged particles, charging the surface of support layer 11, negatively.

It should be appreciated that all polarity charges shown in all the figures may be replaced by their opposites.

This technique herein called double-sided charging provides for stronger fields across conductorless frost members with resultant increased frost photosensitivity and frost density than was possible with prior art conductor type frost members because of arcing from the charged surface to the conductive substrate.

Other charging methods are suitable herein for charging with a corona charging device with the opposite side of the frost member grounded by, for example, a grounded conductor such as metal table or a moistened sponge or a moistened metal sheet. Generally, however, double sided charging is found to be a preferred method of charging conductorless frost members to the high potentials conductorless frost members are inherently capable of accepting and retaining.

Conductive backing type frost members may also be charged by methods suitable for conductorless frost members and may also be conveniently charged by merely grounding the conductive substrate and applying charge to the deformable layer surface as further described in the above-referenced Gunther et al. patent.

The potential difference applied across a given conductorless or conductor type frost member may be readily varied. For example, in corona charging potential difference may be varied by changing the potential difference across the corona wire, changing the geometry of the system such as varying the shield or wire size of the charging device, or varying the spacing between the charging device and the member, or by varying the scan rate or number of scans. On a conductorless frost member comprising a 2 to 2½ micron layer of a preferred deformable material, 10 to 12 microns of a preferred photoconductor on a support of about 75 microns of Mylar, it is found that a potential across the member of about 9,000 volts or an average field strength across the member of roughly 100 volts per micron produced optimum image densities and was otherwise suitable as an optimum field strength. Average field strengths lower than 50 and higher than 250 volts per micron are also found to be suitable herein, although charging in the 50 to 150 volt per micron range is preferred because of resultant high quality images and the absence of voltage discharge problems.

Preferably, a frost member should be charged when the photoconductive layer is at its highest insulating value or when there is an absence of electromagnetic radiation that would make the photoconductor photoelectrically conductive. Thus charging must take place in the absence of that wavelength radiation or light which will make the particular photoconductive material photosensitive.

A variation of the single charge step illustrated in FIG. 1(a), which results in increased image density and lower surface charge densities without a reduction in the value of the field strength across the photoconductor during image exposure is to charge the member in room light to an average field strength of 120–160 volts per micron. Then, with the room lights off, the member is charged oppositely to trap charges separated when the member was charged in room light. The member is then exposed and developed in customary fashion.

The next processing step as shown in FIG. 1(b) is to expose the charged frost member to a pattern of light and shadow. A shown, this may be done by exposing original 20 to actinic radiation from source 22. In the light transmitting portion 23 of original 20, light reaches the photoconductive layer 12 through transparent deformable layer 13 to make the photoconductor electrically conducting in photoconductor areas struck by light. In the light struck portions of the photoconductor there is a collapse of the electric field in the photoconductor which locally lowers the potential at the surface of layer 13.

The next processing step as shown in FIG. 1(c) is to develop the image in light struck areas by temporarily softening deformable layer 13, so that it becomes physically altered by the mechanical forces associated with the electrostatic pattern thereon. Any softening method may be employed provided it does not increase the electrical conductivity of layer 13 sufficiently to cause the electrical charges thereon to become dissipated. The most common method of softening would be to heat or to expose layer 13 to solvents or solvent vapors for the materials of layer 13. The former method is illustrated in FIG. 1(c) wherein conductorless frost member 10 is shown positioned beneath heating element 26. As the material of layer 13 is softened it is enabled to flow in response to electrical forces acting upon it. As illustrated, the surface of layer 13 in exposed areas develops a microscopically uneven surface. This uneven surface can also be described as rippled, stippled, reticulated, wrinkled, or frosted.

When layer 13 is to be softened by the application of solvent vapors the deformable layer material must be capable of absorbing sufficient quantities of a suitable solvent vapor in order that its viscosity be lowered to the point where frosting can take place.

The solvent vapors should be absorbed by layer 13 in sufficient quantity to substantially lower the viscosity of layer 13 and the volatility of the solvent should be chosen where possible to provide a suitable hardening time for the layer. These solvent characteristics are those which would be obvious to a chemist but the electrical properties of the solvent also play a role in influencing image frosting. In the solvent softened condition, layer 13 may actually comprise a substantial amount of solvent, thus, the dielectric constant and resistivity of layer 13 is determined to some extent under these conditions by the dielectric constant and resistivity of the solvent.

Solvent liquids show a great variation in dielectric constant and resistivity. Typical examples of the dielectric constants of certain solvents useful in connection with image frosting are perchloroethylene 2.3, trichloroethylene 3.4, and ethylene dichloride 10.0. As is apparent, where the solvent is applied after the charging step, the lower the dielectric constant of layer 13 the greater will be the electrostatic forces thereacross. It would thus appear desirable to use a solvent liquid having as low a dielectric constant as possible and experiments confirm that best results and most rapid frosting are obtained by using a solvent having a dielectric constant not greater than about that of trichloroethylene, i.e., 3.4.

Thus has been described a single charge process embodiment for producing frost images on conductorless and conductor type frostable members.

Frost images with extremely high maximum resolutions especially for conductorless members are possibile in ancordance herewith. In fact, resolutions greater than 220 line line pairs per millimeter have been obtained for a positive frost reproduction of a negative original and resolutions greater than 80 line pairs per millimeter have been obtained for a negative frost reproduction of a positive original. Image density for these images, where D density=log 1/R where R equals the ratio of reflected light to incident light was found to be greater than the satisfactory figure of 0.80.

It is to be noted that the basic processing steps of the inventive process just described for both conductorless and conductor type frost members are charge-expose-soften. Thus, it is seen that the recharge step which is necessary in prior art frost development methods is eliminated by the invention herein.

This difference in processing along with the advantageous conductorless frost member makeup that is possible herewith suggests that generation of the frost producing charge pattern according to the system herein occurs via a basically new and different electrical and mechanical interaction than that which produces frosting by the recharge process, for example, as described in the above referenced Gunther et al. patent.

While the causes and mechanism of the frosting phenomenon as it occurs with a charge-expose-soften sequence in absence of a recharging step, are not completely understood, a theory has been proposed which appears to account for the observed phenomena.

It is thought, in agreement with previously postulated frost theories, that frost rates are proportional to charge densities. However, in the single charge frost process of this invention, charge density differences are not created by recharging but are created, it is thought, by charging and exposing followed by an inherent lateral charge transfer which occurs between areas of different potential in other words, along lines of potential gradient which ordinarily correspond to light struck non-light struck boundaries on layer 13. The lateral charge transfer or breakdown is thought to occur through the air and/or by a bulk internal charge transfer through the deformable layer itself to create the charge density differences along light-dark lines or lines of potential gradient tending to thereby increase the deformable layer's surface charge density in the lower potential areas thus causing frosting to occur in these regions by unstable attraction to the base.

It is important to distinguish the single charge frost imaging system of this invention from prior art relief type imaging systems. An important distinguishing factor is that relief imaging is typified by the formation of a single deformation along each potential gradient, light-dark line while by the process described herein a series of deformations or wrinkles are produced beginning at each potential gradient, light-dark line and extending therefrom into light struck portions of layer 13. For example, referring to the light struck portion of the imaging member shown in FIG. 1(c) assuming a portion width as shown of about 1 mil and an indefinite portion length and a deformable layer thickness of about 2 microns, it is found that frosting occurs across the entire 1 mil portion and the entire length of the line, the frosting appearing as 4 or 5 wrinkles to give a complete continuous tone, solid area development.

Single charge frosting is thought to be not so dependent on the relative capacitance of the layers in the frost member as on the absolute change of potential across the member in light struck areas which in turn for a given field strength across the member and a given thickness of the photoconductive insulating layer is dependent on the intensity of the exposure and the thickness and the dielectric constant of the photoconductive insulating layer.

It was discovered in work done on conductorless frost members that the increased charge density in the lower potential areas capable of producing frost images persisted even after room lights were turned on. The final charge distribution, transfer or breakdown is apparently unaffected by later exposure to visible light, since it is found that development in room light is possible after image exposure. For preferred frost image member configurations, it is found that the charge transfer occurs within about 4 seconds after exposure. It is thought that the charge transfer or breakdown takes place at least partially in the bulk of the frost member itself since after the 4 second period, extreme humidity conditions or even immersing the imaging member into water and other liquids before developing is found to not adversely effect subsequent frost development.

The theory behind the single charge frost process disclosed herein permitting development to take place in room light or in the presence of other normally actinic radiation is explained by the following example wherein actual figures are used rather than symbols for ease of understanding.

Assume, for example, a conductorless frost member with about a 3 micron layer of deformable material overlying about a 20 micron layer of a photoconductor overlying about a 77 micron layer of support material, charged to a surface potential of 10,000 volts which for a member of about 100 micron total thickness would result in an average field strength across the member of about about 100 volts per micron. Upon exposure of the member to an image, for example, as in FIG. 1(b), dark areas of the deformable layer 13 will still have the surface potential of 10,000 volts on it, while, the collapse of electric field in light struck portions of the photoconductive layer 12 locally lowers the potential at the free surface of corresponding portions of the deformable layer 13 by an amount corresponding to the change in the effective capacitance. Assume, for example, that light struck areas of deformable layer 13 after exposure are at a surface potential of only 8,000 volts. This would leave deformable layer 13 as illustrated in FIG. 1(b) with two dark surface areas charged to 10,000 volts and an 8,000 volts light struck surface area. It is thought that there now occurs electrical breakdown or charge transfer in the air gap and/or through the bulk of the front member between dark, higher voltage areas and light struck, lower voltage areas because the air gap and/or the bulk of the member at the boundaries of these adjacent areas cannot support the edge effect 2,000 volt charge difference. Assuming that the air gap and/or bulk will support only a 1,000 volt charge difference there will be a breakdown or charge transfer until the light struck lower voltage area which was at 8,000 volts is charged to 8,500 volts and the dark higher voltage areas which were at 10,000 volts are discharged to 9,500 volts.

If the member is then developed in the absence of actinic light, which was thought to be necessary in prior art frost processing, frost appears in the light struck lower voltage but higher surface charge areas as a result of the unstable attraction of these larger surface charges to the support layer.

Alternatively, if the member is developed in room light after the breakdown has taken place, it is thought that the previous dark areas at 9,500 volts will decrease to 7,600 volts because of the collapse of the field in the photoconductive layer upon exposure to the actinic room light while the light struck 8,500 volt area is discharged 100 volts to 8,400 volts. The remaining potential difference of 800 volts at the boundaries between light struck and dark areas is less than the assumed critical difference of 1,000 volts thus no further breakdown takes place. Thus, frost will appear even though development takes place in the presence of actinic light because there still exists the surface charge density variations which cause high surface charge, light struck areas to be unstably attracted to the base thus creating deformation forces sufficient to overcome surface tension forces inherent in deformable layer 13, to create frosting.

Referring now to FIG. 2, there is shown in FIG. 2(a) a typical conductorless or conductor type frost member which is charged and exposed for example as shown in FIG. 1. The graphical representations 2(b) and 2(c) show the expected voltage and charge density respectively of the free surface, immediately after exposure. The graphical representations 2(d) and 2(e) show the voltage and charge density respectively after a period of time empirically found to be approximately 4 seconds after exposure. Illustratively, it is seen that potential gradient is reduced in the light struck portion followed by charge migration across potential gradient, light-dark boundaries into the light struck area, resulting in a higher charge density in the exposed regions to create frosting.

A next processing step which may be carried out after developing is to reharden layer 13 freezing the frost surface pattern in place which pattern may then be viewed.

This can be accomplished, for example, by removing the source of heat, solvent vapor or the like used to soften deformable layer 13. It is generally desired to reharden layer 13 as soon as the frosted pattern appears. Heat softening generally permits quicker rehardening. Excessive softening temperatures or excessively prolonged periods of softening of layer 13 are also to be avoided because a loss of the image pattern may result.

For example, Piccolastic A–50 and other deformable materials while nominally solid have been found to frost at very low development temperatures in the range of from about 40° C. to about 60° C. and have sufficient flow properties in their normal state that frosted images thereon will smooth out and disappear of themselves in less than a day. This type frost image which otherwise would tend to fade can be preserved by overcoating with a thin film of a more rigid material, preferably one which does not attack the deformable layer. A thin solution of gelatin is quite suitable. A layer of gelatin approximately 1 micron thick applied over a Piccolastic A–50 frost image preserves the image indefinitely.

The frosted image produced by the foregoing procedure may be examined simply by looking at it, but may also be efficiently utilized in a projection system such as that shown in FIG. 1F of Gunther et al. Pat. 3,196,011.

Where the various layers comprising member 10 are transparent, as, for example, where glass, polyester film or other type transparent support member is employed with a transparent photoconductive material and a transparent deformable material, the frosted image may also be viewed by transmitted light methods, including the use of conventional slide projectors and the like. The narrower the cone of light accepted by the optical system, the greater will be the density of the image. Where a permanent frost image is required, the foregoing process steps complete this embodiment of the invention.

Often, however, it is desired to reuse member 10 and it becomes necessary to erase the image therefrom. This can be done by employing the same procedures which may be used for softening layer 13 in the first place. Thus, layer 13 may again be heated or exposed to solvent vapors, preferably in the presence of light. The light causes dissipation of charges in photoconductive insulating layer 12 while extensive softening of layer 13 also permits diffusion and neutralization of charges thereon and permits surface tension forces to restore the surface of layer 13 to a smooth condition.

Various modifications of the above method steps may be employed for the creation of frosted images without departing from the present invention concept. One simple modification makes use of the fact that a softened deformable layer may remain in a softened condition for periods ranging up to several minutes or more. This is particularly true where softening is accomplished by the vapors of high boiling liquids, or where heat softening is employed and member 10 has a large thermal mass.

When layer 13 remains soft for a reasonable length of time, it is possible to soften it before exposure to the image pattern of light and shadow rather than afterwards.

The theory of single charge frost and conductorless frost members which are advantageously employed in this process and its reliance on potential gradients suggest a characteristic which is borne out in fact; namely that graphic representations greater than a certain maximum width will not frost faithfully in continuous tone or solid area fashion without the use of screening techniques to be described.

More specifically, it is found that single charge frosting as herein described faithfully reproduces solid area and continuous tone graphic images with image portions less than about 1 or 2 mils in width while for characters above about 1 or 2 mils in width it is found that the frost reproduction of the characters have an internal or an external halo. As an example of internal halo a 1 inch by 1 inch square on a negative original (white square on a black background) would be reproduced with frosting taking place from the edges of the square inward for a distance generally of about 1 or 2 mils with a hollowed out unfrosted internal portion of the square. As an example of an external halo a 1 inch by 1 inch square on a positive original (black square on a white background) would produce a frost negative, frosting in the background areas, which according to the above method would give an external halo or frost development outward from the edges of the original black square.

It is clear that frost images produced by the novel single charge system disclosed herein are highly suitable for many purposes including the storing of information in micro-image form, for example, wherein the reproduction is ⅓, ⅙, ¹⁄₁₂, etc. the size of the original document and in this application as well as many others, the width of the image portions of information to be reproduced in frost form many be less than about 1 or 2 mils and the process as described in FIG. 1 will be entirely suitable to give faithful line copy, continuous tone and solid area reproduction. Also, for frost reproduction of image portions of width greater than about 1 or 2 mils, the halo characteristic of single charge frosting is a pleasing and appealing method of image representation, for example, for advertising purposes or other "eye-catching" applications and may be suitable without further development techniques. Despite certain advantages of the hollowed out characteristic of single charge frosting it may be appreciated that there will be imaging applications wherein it is desired to enhance single charge frost solid area and continuous tone development so that for example large solid areas will be reproduced by single charge frosting with no halo effect.

Continuous tone and solid area response in single charge frosting is provided by optically screening the image during exposure which is thought to create a plurality of potential gradient light-dark boundaries across the member to create a sufficient number of charge density differences per unit area to cause frosting with no hollowed out portions.

Screens generally comprising alternating opaque transparent or translucent portions, may take a wide variety of configurations, may be comprised of a number of various materials and may be variously placed to enhance solid area and continuous tone response in the single charge, frost process of the invention. If exposure is from the deformable layer side of the frost member the screen may be placed in the plane of the original, in contact with or adjacent the outside surface of the deformable layer or at the interface of layers 12 and 13, so long as the image in transparent portions of the screen is permitted to reach layer 12 substantially in focus. If exposure is from the support layer side of the frosted member, the screen may be placed in the image plane, in contact with or adjacent the outside surface of the support layer or at the interface of layers 11 and 12. Also, the screen may comprise a controlled ruled or roughened effect produced on either or both surfaces of the support layer 11. A preferred screen placement is to incorporate the screen right in the support member 11 itself which has the added advantage of preserving the screen from dust and other deleterious substances in the ambient air.

In addition, it has been found that some photoconductive materials such as selenium or the organic photoconductor 2,5-bis(p-aminophenyl)-1,3,4-oxadiazole in a Vinylite VYNS binder have sufficient internal noise do their own internal screening thus making a separate screening structure unnecessary. Internal screening chaarcteristics of certain photoconductors is thought to be due to light sensitivity variations and/or dark decay variations that form potential gradient boundaries in exposed portions to give solid area average. Plates may be purposely constructed to provide potential gradient boundaries for example by periodically varying the thickness of the plate. Also, the sensitivity of plates may be modulated which also creates potential gradient boundaries on the surface of the deformable layer.

Optical screens for use herein may be constructed in a wide variety of ways. For example, it has been found that mechanically or electrostatically formed transparent frosted films or a variety of ruled screens may be utilized herein.

A preferred mechanically formed screen for use herein is type "T" 100 gauge Mylar. Because this is a lower grade, higher flaw content Mylar polyester film with a multiplicity of surface imperfections, this type Mylar has been found to exhibit better screening capabilities than better grades of Mylar absent the flaw content, thus enhancing continuous tone response and improving the density of conductorless frost images. Of course, it is very suitable to have this type Mylar serve as screening material since it can also be used as material for support layer 11 in conductorless or conductor type member configurations. Exposure from the support layer side produces the desired screening effect.

If the surface imperfections of the film are not prominent enough to produce a satisfactory screening effect, selective roughening or ruling of a surface of the film has been found to enhance screening characteristics with a wide variety of mechanically formed screens. To place the roughtened or ruled surface of the film at the interface of layers 12 and 11 of course is normally preferred for support layer side exposure since this placing protects the screened surface of the support layer from collecting dust or other particles from the ambient air which may be found to deleteriously affect uniform image development.

Any suitable mechanically frosted film or layer may be used herein. Typical mechanically frosted films are: Scotch Brand Magic Transparent No. 810 acetate base pressure sensitive adhesive tape, commercially available from the 3-M Company; Cronaflex UC-4, drafting film, commercially available from the E. I. du Pont de Nemours Company; other types and grades of Mylar; lenticulated film base and embossed Kinescope recording safety film both commercially available from the Eastman Kodak Co.; ground glass, for example, ground microscope slides and acetate replica defraction grating, and others.

A preferred electrically formed frosted film for use as a screen herein because of its transparency and frostable characteristics is frosted Staybelite Ester 10. Any suitable electrostatically frostable; transparent material may be used herein. Typical frostable, transparent materials are Piccotex-100 resin. Piccolastic A-50 and others mentioned herein and known in the art. Of course these materials may also be ruled or selectively roughened to produce an optical screen.

Other optical screens made by a variety of methods from a wide variety of materials will occur to those skilled in the art. Even ruled silver halide transparencies or silver halide transparencies imaged in a screen pattern may be used as screens herein.

Optical screening in the single charge frost process hereof is found to enhance continuous tone and solid area development response to a level comparable with prior art recharge frost processing employing conductor type frost members and is found to enhance image density to densities greater than 1.2.

Electrostatically produced deformation screens are especially suitable for use herein since the effectiveness of a screen is found to be somewhat dependent on its period (the distance from elevation to elevation or depression to depression of the frost wrinkles or ruled portions, or center to center spacing of portions of maximum density in density-modulation screens) and the period of a frosted thermoplastic screen may be readily controlled by varying the thickness of the screen. The frost period has been found to be substantially equal to twice the thickness of the deformable layer in the range of thicknesses used herein and the frost pattern bears very little relationship on the microscopic level to the configuration of electrostatic image pattern which causes it. With deformable layers on the order of a few microns or less the frost period increases to about five times the layer thickness as frosting becomes more pronounced. This effect diminishes with increasing layer thickness and at 100 microns the line-to-line spacing is about equal to the thickness for any degree of frosting. This relationship of a frosted screen to its thickness provides a ready mechanism to vary the period of the screen by varying the thickness of the thermoplastic film and of course with certain thicknesses by varying the degree of frosting. It is thought that the hills of these films act as lenses. The frosted films are placed so that the lenses, the hills, focus the transmitted light to points in the plane of the photoconductor. Conveniently, the screen may be placed in contact with the deformable member 13 and the image exposed through it.

Satisfactory frosting was obtained utilizing single charge frosting as described herein with screens of periods between 1 and 4 times the natural period of the thermoplastic imaging film deformable layer 13 with optimum results resulting with screens with average periods matching 1:1, the natural average period of the thermoplastic used in deformable layer 13.

It is to be noted that in a given application irrespective of whether continuous tone enhancement is desired, screening is generally found to enhance image density and contrast over unscreened single charge process frost images.

Although FIG. 1 illustrates a reversal imaging process, i.e., where the original is a negative a positive will be formed on the frost member and where the original is a positive a negative will be formed on the frost member, positive to positive imaging on a conductorless or conductor type frost members is possible by charging as illustrated in FIG. 1 and then exposing the member to an optical screen pattern before, during or after image exposure. Because of the nature of the present imaging process and the breakdown effect only post image exposure to an optical screen was found to give good quality positive images of high density. Image density is enhanced if the image exposure is of sufficient intensity and duration to substantially discharge light struck areas.

The following examples further specifically define the present invention with respect to the use of single charge frosting to produce frost images. Parts and percentages are by weight unless otherwise indicated. The examples below are intended to illustrate various preferred embodiments of the novel single charge frost process of this invention.

Example I

Mylar polyester film of about 100 micron thickness is placed on a rubber mat and cleaned by wetting with isopropanol and wiping dry with tissue, if necessary. A solution of the photoconductor 2,5-bis (p-aminophenyl)-1,3,4-oxadiazole and the resinous binder material Vinylite VYNS, a copolymer of vinyl chloride and vinyl acetate available from Carbide and Carbon Chemicals Co. in diethylketone in proportion of about 30 grams of the photoconductor and about 30 grams of the VYNS to about every 300 milliliters of diethylketone is prepared. A film of the solution is applied to the Mylar using a gravure roller. The photoconductive solution dries to a thickness of about 10 microns. About 30 seconds after coating the photoconductor on the Mylar, the film is placed in an oven at about 80° C. for two hours. It is then removed from the oven, allowed to cool and the photoconductor is overcoated with a solution of deformable layer material Staybelite Ester 10 dissolved in Super/Naptha available from Buffalo Solvent & Chemical Corp., in the proportion of about 30 grams of Staybelite to about 100 milliliters of the Super Naptha. This film dries to a final thickness of about 3 microns after heating it in an oven at about 50° C. for about one hour. The conductorless frost member is then charged by placing it over the opening in an insulating charging platform formed by a layer of grounded non-conducting glass which is interposed between 2 sets of two, three mil diameter wires spaced ½ inch apart and ½ inch from the member, oppositely biased to about 10,000 volts and passing the member twice therebetween at a rate of about 2 inches per second. An Omega D–2 enlarger available from Simmon Bros. Inc. with a 500 watt lamp is used as the light source the intensity of light at the image plane being about 125 f.c.s. where the lens is set at F/4.5, exposure lasts two seconds.

Development of the film is accomplished by heating the film by drawing it taut over a heated cylinder aluminum block which is covered with a 3 mil Mylar film the deformable surface facing away from the block which is heated to about 55° C. by placing it on a hot plate coated with silicone oil to ensure better thermal contact.

A visible, high resolution, frost image results with frosting occurring in light struck areas of the conductorless frost member with image portions greater than about 1 or 2 mils in width showing the hollowed out effect.

Example II

Mylar polyester film of about 150 micron thickness is placed on a rubber mat and cleaned by wetting with isopropanol and wiping dry with tissue if necessary. A solution of about 2 parts 2,4,7-trinitro-(9)-fluorenone to about 8 parts of polyvinyl carbazole in about 72 parts of toluene and about 72 parts of cyclohexanone is prepared. A film of the solution is applied to the Mylar film using a gravure roller. The photoconductive solution dries to a thickness of about 8 microns. About 30 seconds after coating the photoconductor on the Mylar film is placed in an oven at about 80° C. for about two hours. It is then removed from the oven, allowed to cool and the photoconductor is overcoated with a solution of deformable layer material Piccotex-100 in toluene, in proportion of about 30 grams of Piccotex-100 to about 100 milliliters of toluene. This film dries to a final thickness of about 4 microns after heating it in an oven at about 50° C. for about one hour. The conductorless frost member is then charged in the same manner as in Example I.

An optical screen comprising a naturally electrostatically frosted member of Staybelite Ester 10 of a thickness of about 4 microns is placed in contact with the thermoplastic layer of the conductorless frost member. The member is exposed to the same original in the same manner as in Example I. Development is in the same manner as in Example I.

A visible, high resolution frost image results exhibiting excellent continuous tone and solid area response and with an image density somewhat greater than that of the frost image resulting in Example I.

In addition to the screening technique which has utility for both conductorless and conductive backing type frost members, it is found that various recharge techniques are available to enhance image development and especially the resultant image contrast of conductorless frost members which have been found to be so suitable for use in the single charge frost process hereof.

Recharging may take place in any one of a number of ways including recharging after exposure by conventional corona charging techniques, drawing a grounded razor blade over the back surface of the conductorless frost member or by charging with A.C. corona. A.C. corona recharging was found to be especially suitable since such a device restores the top surface to equi potential by adding positive charge to the illuminated areas or negative charge to the dark areas or both, depending upon the applied bias or equilibrium potential to which the A.C. corona discharge device charges the surface.

An alternative procedure is to recharge a conductorless frost member after a screened image exposure to a potential lower than the initial potential. FIG. 3 summarizes the results in a plot of final surface potential vs. image contrast for a preferred embodiment of a conductorless frost member. The initial potential applied for the data represented in FIG. 3 was 10,000 volts.

Although recharging of conductorless frost members may be practiced sequentially as part of a single or a plurality of charge-expose-recharge sequences, the effect of recharging may be accomplished by simultaneously charging and exposing.

Figure 4:
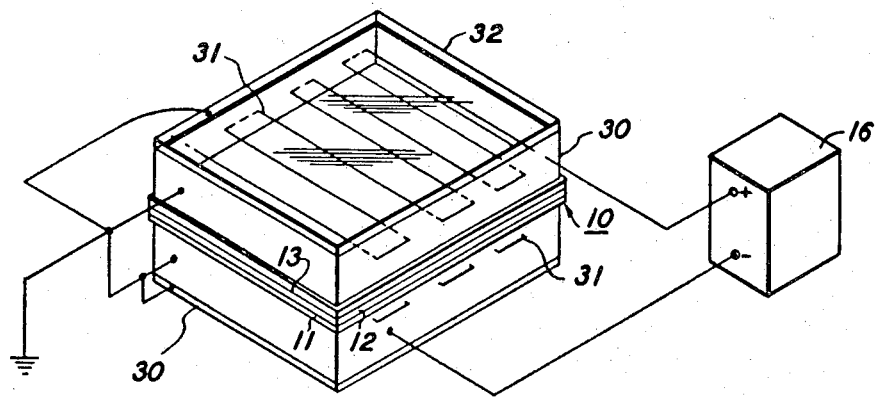
FIG. 4 is an apparatus for simultaneously charging-exposing and recharging a conductorless frost member according to an alternative embodiment of the invention.

Referring now to FIG. 4 there is illustrated a form of apparatus adapted for carrying out the simultaneous charging and exposing of a conductorless frost film. The apparatus comprises two insulating frameworks 30, each approximately ⅞ inch high sandwiching a conductorless frost member 10. Stainless steel wires 31, 0.003 inch in diameter are woven through each frame 30 in horizontal rows ½ inch apart and spaced ½ inch from the surface of member 10. Each frame is covered with a sheet of electrically conducting glass 32. One terminal of high voltage power supply 16 capable of supplying a direct current potential up to about 20,000 volts is connected to wire 31 strung in the top insulating framework 30 and the other terminal is connected to wire 31 strung in the insulating framework 30 below member 10. The two sheets of electrically conducting glass and the two insulating frameworks are connected to ground as shown. Power supply 16 normally supplies from 4,000 to 6,000 volts to each set of wires 31. An enlarger may be positioned above the structure and adapted to project a light image onto conductorless member 10. Wire 31 is so small and so positioned that it does not cast a perceptible shadow on conductorless frost member 10. The illustrated apparatus is capable of simultaneously exposing and charging a conductorless frost member.

Although specific components and proportions and specific process steps have been stated in the above description of preferred embodiments of single charge frosting and making and processing the conductorless and conductor type frost members utilized herein other suitable materials and other processing steps as described herein may be used with similar results.

In addition, other materials may be added to the mixtures described herein and various changes may be made in the steps hereof to synergize, enhance or otherwise modify the invention. For example, various other sensitizers including dyes may be added to the photoconductive layers described herein to increase their light sensitivity. Illustratively, 30 milligrams of Rhodamine B sensitizing dye available from National Analine Div., Allied Chemical Corp., may be added as a 1.0 percent solution in ethanol to the photoconductor solution prepared in Example I. Also, Brilliant Green sensitizing dye, available from National Analine Div., Allied Chemical Corp., may be added to the photoconductor solution prepared in Example II. In addition, many other resinous materials are available for use with TO 1920 and other suitable photoconductors to form binder plates including for example such materials as Lytron 820 a polyelectrolite available from Monsanto Chemical Co., cellulose acetate butyrate available from Eastman Chemical Co. and many others.

It will be understood that various other changes in the details, materials and process steps which have been herein described and illustrated in order to explain the nature of the invention will occur to and may be made by those skilled in the art upon a reading of this disclosure and such changes are intended to be included within the principle and scope of this invention.

What is claimed is:

1. A single charge frost imaging method comprising the steps of:
    (a) providing an imaging member comprising a support layer, a photoconductive layer overlying said support layer and a charge retaining surface deformable layer overlying said photoconductive layer;
    (b) electrically charging said member, wherein an electric field of strength sufficient to cause frosting in said deformable layer when said layer is softened is established through said member;
    (c) imagewise exposing said member to an image pattern of activating electromagnetic radiation;
    (d) softening said deformable layer; and
    (e) maintaining said deformable layer in a softened state until the surface of said deformable layer imagewise deforms in a frost pattern; wherein the electrically charging step is the only electrically charging of said member through steps (a)–(e).

2. A method according to claim 1 wherein said deformable layer is softened by heat at least after said charging.

3. A method according to claim 1 wherein the average uniform electric field through the member after electrically charging is greater than about 50 volts per micron.

4. A method according to claim 1 wherein said layer of surface deformable material is of a substantially uniform thickness throughout of between about 1 and about 6 microns and said photoconductive layer is of a substantially uniform thickness throughout of between about 3 and about 40 microns, and said imagewise exposing occurs after said electrically charging.

5. A method according to claim 1 including the step of optically screening said member.

6. A method according to claim 5 wherein imagewise exposing and optical screening are performed by imagewise exposing through an optical screen.

7. A method according to claim 6 wherein the optical screen comprises alternating opaque and translucent portions at a period of between from about one to about four times the natural frost period of said deformable layer and wherein the imagewise frost deformation occurs in the imagewise exposed and optically screened areas of said deformable layer.

8. A method of claim 7 wherein said optical screen comprises frosted material which is substantially translucent or transparent when unfrosted.

9. A method according to claim 7 wherein the period of said optical screen is between from about 2 to about 8 times the thickness of the deformable layer.

10. A method according to claim 5 wherein the imaging member over the imaging area is optically screened.

11. A method according to claim 10 wherein the imagewise frost deformation occurs in the non-imagewise exposed but optically screened areas of said deformable layer.

12. A method according to claim 11 wherein said member is optically screened after imagewise exposing.

13. A method according to claim 9 wherein said support, said photoconductive layer and said deformable layer each are substantially translucent or transparent.

14. A method according to claim 9 wherein imagewise exposing is sufficient to substantially discharge said photoconductive layer in light struck areas.

15. A method according to claim 1 wherein said photoconductive layer periodically varies in thickness at a period of from about one to about four times the natural frost period of said deformable layer.

16. A method according to claim 1 wherein said photoconductive layer periodically varies in light sensitivity at a period of from about one to about four times the natural frost period of said deformable layer.

17. A method according to claim 1 wherein said support layer is electrically insulating and comprises a material of electrical resistivity greater than about $10^{14}$ ohm-centimeters.

18. A method according to claim 17 wherein said member is charged by directing corona to the deformable layer side of said member while simultaneously directing oppositely charged corona to the electrically insulating layer side of said member.

19. An imaging method according to claim 17 wherein said electrically insulating support is between about 25 and 200 microns thick.

20. An imaging method according to claim 1 wherein said deformable material is maintained in a softened state in the presence of uniform activating radiation.

21. An imaging method according to claim 1 wherein said deformable material is maintained in a softened state by providing an already softened deformable layer at least prior to said imagewise exposing step.

22. An imaging method according to claim 7 wherein the imagewise exposure is from the support layer side of the imaging member and the optical screen contacts the imaging member and is situated between the photoconductive layer and the imagewise exposure source.

23. An imaging method according to claim 22 wherein said optical screen is located at the interface between the photoconductive layer and the support layer.

24. An imaging method according to claim 22 wherein said optical screen is in contact with the surface of the supporting layer opposite said photoconductive layer.

25. An imaging method according to claim 22 wherein the screen is at least one controlled ruled or randomly roughened surface of said support layer.

26. An imaging method according to claim 22 wherein said optical screen is incorporated in the support member itself.

27. An imaging method according to claim 1 wherein said support is electrically conductive.

28. An imaging method according to claim 7 wherein the screen is at a period of about twice the thickness of the deformable layer.

29. An imaging method according to claim 25 wherein said support layer is a film of polyethylene terephthalate polyester.

30. A method according to claim 1 wherein the imagewise frost deformation occurs in the imagewise exposed areas of said deformable layer.

31. A method according to claim 6 wherein the imagewise frost deformation occurs in the imagewise exposed and optically screened areas of said deformable layer.

32. An imaging method according to claim 7 wherein the imagewise exposure is from the deformable layer side of the imaging member and the optical screen contacts the imaging member and is situated between the photoconductive layer and the imagewise exposure source.

33. An imaging method according to claim 3 wherein the average uniform electric field through the member after electrically charging is between about 50 to about 150 volts/micron and wherein charging takes place in the absence of activating electromagnetic radiation.

34. An imaging method comprising the steps of:
    (a) providing an imaging member comprising a support layer, a photoconductive layer overlying said support layer and a charge retaining surface deformable layer overlying said photoconductive layer;
(b) electrically charging said member, wherein an electric field of strength sufficient to cause frosting in said deformable layer when said layer is softened is established through said member;
(c) imagewise exposing said member to an image pattern of activating electromagnetic radiation;
(d) optically screening said member at a period of from between about 1 to about 4 times the natural frost period of said deformable layer;
(e) softening said deformable layer; and
(f) maintaining said deformable layer in a softened state until the surface of said deformable layer imagewise deforms in a front pattern.

35. An imaging method according to claim 34 wherein imagewise exposing and optical screening are performed by imagewise exposing through an optical screen.

36. An imageing method according to claim 35 wherein the imagewise frost deformation occurs in the imagewise exposed and optically screened areas of said deformable layer.

37. An imaging method according to claim 34 including after the charging step a step of recharging said member to a substantially uniform potential.

38. An imaging method according to claim 34 wherein said electrically charging and imagewise exposing are carried out simultaneously.

39. A method according to claim 34 wherein the imaging member over the imaging area is optically screened.

40. An imaging method according to claim 39 wherein the imagewise frost deformation occurs in the non-imagewise wise exposed but optically screened areas of said deformable layer.

41. An imaging method according to claim 40 wherein said member is optically screened after imagewise exposing.

42. An imaging method according to claim 34 wherein imagewise exposure is from the deformable layer side of the imaging member and the optical screen contacts the imaging member and is situated between the photoconductive layer and the imagewise exposure source.

43. An imaging method according to claim 35 wherein said optical screen comprises alternating opaque and translucent portions at a period of between from about 2 to about 8 times the thickness of said deformable layer.

44. An imaging method according to claim 34 wherein said support is electrically conductive.

45. An imaging method according to claim 40 wherein said member is optically screened after imagewise exposing.

46. An imaging method according to claim 45 wherein the member is optically screened by directing activating electromagnetic radiation through an optical screen comprising alternating opaque and translucent portions at a period of from between about 1 to about 4 times the natural frost period of said deformable layer.

47. An imaging method according to claim 35 wherein said support layer is electrically insulating and wherein after said screened image exposure said member is recharged to a second potential of the same polarity as said first potential and of a value from about 0.3 to about 0.6 times the value of said first potential.

48. An imaging method according to claim 36 wherein said support, said photoconductive layer, and said deformable layer each are substantially transparent.

49. An imaging method according to claim 40 wherein said support, said photoconductive layer, and said deformable layer each are substantially transparent.

50. An imaging method according to claim 34 wherein said photoconductive layer is of a substantially uniform thickness throughout the imaging area in the range of between about 3 and about 40 microns and said deformable layer is of a substantially uniform thickness throughout the imaging area of in the range of between about 1 and about 6 microns.

51. An imaging method according to claim 50 wherein said deformable layer is between about 2 to about 2½ microns thick.

52. An imaging method according to claim 34 wherein an already softened deformable layer is provided at least prior to said exposing step.

53. An imaging method according to claim 34 wherein imagewise exposure is from the support layer side of the imaging member and the optical screen contacts the imaging member and is situated between the photoconductive layer and the imagewise exposure source.

54. An imaging method according to claim 53 wherein said optical screen is located at the interface between the photoconductive layer and the support layer.

55. An imaging method according to claim 53 wherein said optical screen is in contact with the surface of the supporting layer opposite said photoconductive layer.

56. An imaging method according to claim 53 wherein the screen is at least one controlled ruled or randomly roughened surface of said support layer.

57. An imaging method according to claim 53 wherein said optical screen is incorporated in the support member itself.

58. An imaging method according to claim 34 wherein said optical screen is a frosted deformable layer.

59. An imaging method according to claim 34 wherein the optical screen is at a period of about twice the thickness of the deformable layer.

60. A frost deformation imaging member comprising an insulating support layer, a photoconductive layer overlying said insulating support layer and a charge retaining surface deformable layer overlying said photoconductive layer and further including an optical screen as an integral part of the above-identified imaging member, said screen having a period of from between about 1 to about 4 times the natural frost period of said deformable layer.

61. An imaging member according to claim 60 wherein said optical screen is situated at the interface between the photoconductive layer and the support layer.

62. An imaging member according to claim 60 wherein said optical screen is incorporated in the support member itself.

63. An imaging member according to claim 60 wherein the deformable layer is between about 1 and about 6 microns thick, wherein said photoconductive layer is between about 3 and about 40 microns thick and wherein said optical screen is at a period between about 2 to about 8 times the thickness of said deformable layer.

64. An imaging method comprising the steps of:
(a) providing an imaging member comprising a support layer, a photoconductive layer overlying said support layer and a charge retaining surface deformable layer overlying said photoconductive layer, wherein said photoconductive layer periodically varies in thickness in a period of from about 1 to about 4 times the natural frost period of said deformable layer;
(b) electrically charging said member wherein an electric field of strength sufficient to cause frosting in said deformable layer when said layer is softened is established through said member;
(c) exposing said member to an image pattern of activating electromagnetic radiation;
(d) softening said deformable layer; and
(e) maintaining said deformable layer in a softened state until said deformable layer imagewise deforms in a frost pattern.

65. An imaging method comprising the steps of:
(a) providing an imaging member comprising a support layer, a photoconductive layer overlying said support layer and a charge retaining deformable layer overlying said photoconductive layer, said photoconductive layer periodically varying in light sensitivity at a period of from between about 1 to about 4 times the natural frost period of said deformable layer;

(b) electrically charging said member; wherein an electric field of strength sufficient to cause frosting in said deformable layer when said layer is softened is established through said member;

(c) imagewise exposing said member to an image pattern of activating electromagnetic radiation;

(d) softening said deformable layer; and (e) maintaining said deformable layer in a softened state until the surface of said deformable layer deforms in a frost pattern in the imagewise exposed areas of said deformable layer.

66. An imaging method according to claim 56 wherein said support layer is a film of polyethylene terephthalate polyester.

67. An imaging method according to claim 34 wherein after electrically charging said member is imagewise exposed then uniformly exposed to activating radiation, then recharged to the same polarity before said member is maintained in a softened state by softening.

68. An imaging method according to claim 65 wherein said photoconductive layer comprises a material selected from the group consisting of selenium and 2,5-bis-(p-aminophenyl) - 1,3,4 - oxadiazole in a vinylchloride-vinylacetate copolymer binder.

69. An imaging method comprising the steps of:

(a) providing an imaging member comprising a support layer, a photoconductive layer overlying said support layer and a charge retaining deformable layer overlying said photoconductive layer, said photoconductive layer periodically varying in dark decay at a period of from between about 1 to about 4 times the natural frost period of said deformable layer;

(b) electrically charging said member, wherein an electric field of strength sufficient to cause frosting in said deformable layer when said layer is softened is established through said member;

(c) imagewise exposing said member to an image pattern of activating electromagnetic radiation;

(d) softening said deformable layer; and (e) maintaining said deformable layer in a softened state until the surface of said deformable layer deforms in a frost pattern in the non-imagewise exposed areas of said deformable layer.

References Cited

UNITED STATES PATENTS

| | | | |
|---|---|---|---|
| 3,121,006 | 2/1964 | Middleton et al. | 96—1.5 X |
| 2,599,542 | 6/1952 | Carlson | 96—1.5 |
| 3,003,870 | 10/1961 | Jarvis et al. | 96—1.7 |
| 3,542,545 | 11/1970 | Goffe | 96—1.1 |
| 3,196,011 | 7/1965 | Gunther et al. | 96—1.1 |
| 3,436,216 | 4/1969 | Urbach | 96—1.1 |
| 3,214,272 | 10/1965 | Ploke | 96—1.1 |
| 3,337,339 | 8/1967 | Snelling | 96—1.5 X |
| 3,672,886 | 6/1972 | Mammino | 96—1.1 |

FOREIGN PATENTS

| | | | |
|---|---|---|---|
| 1,375,297 | 9/1964 | France | 96—1.6 |

OTHER REFERENCES

Gaynor et al., "Photoplastic Recording," Photo. Sci. and Engr., vol. 7, No. 4, July-August 1963, pp. 209–213.

ROLAND E. MARTIN, JR., Primary Examiner

U.S. Cl. X.R.

96—1 R, 1.5, 45, 116; 178—6.6 TP; 346—173 TP, 74 TP